I
US010024991B2

(12) United States Patent
Keskes

(10) Patent No.: US 10,024,991 B2
(45) Date of Patent: Jul. 17, 2018

(54) METHOD AND DEVICE FOR PROCESSING SEISMIC SIGNALS

(71) Applicant: TOTAL SA, Courbevoie (FR)

(72) Inventor: Noomane Keskes, Pau (FR)

(73) Assignee: TOTAL SA, Courbevoie (FR)

( * ) Notice: Subject to any disclaimer, the term of this patent is extended or adjusted under 35 U.S.C. 154(b) by 117 days.

(21) Appl. No.: 15/034,807

(22) PCT Filed: Sep. 24, 2014

(86) PCT No.: PCT/FR2014/052395
§ 371 (c)(1),
(2) Date: May 5, 2016

(87) PCT Pub. No.: WO2015/067864
PCT Pub. Date: May 14, 2015

(65) Prior Publication Data
US 2016/0291179 A1    Oct. 6, 2016

(30) Foreign Application Priority Data
Nov. 5, 2013    (FR) ...................................... 13 60836

(51) Int. Cl.
*G01V 1/30*    (2006.01)

(52) U.S. Cl.
CPC .............. *G01V 1/302* (2013.01); *G01V 1/301* (2013.01); *G01V 1/306* (2013.01); *G01V 2210/622* (2013.01); *G01V 2210/624* (2013.01); *G01V 2210/6224* (2013.01); *G01V 2210/6244* (2013.01); *G01V 2210/6246* (2013.01)

(58) Field of Classification Search
CPC ........ G01V 1/301; G01V 1/302; G01V 1/306; G01V 2210/624; G01V 2210/6224; G01V 2210/622; G01V 2210/6244; G01V 2210/6246
See application file for complete search history.

(56) References Cited

U.S. PATENT DOCUMENTS 7,577,529 B2 *    8/2009    Rietsch .................... G01V 1/30
                                                                       702/14
8,743,115 B1 *    6/2014    Mallet .................... G01V 1/302
                                                                       345/419

(Continued)

OTHER PUBLICATIONS

International Search Report for PCT/FR2014/052395, dated Mar. 30, 2015, 4 pages.

(Continued)

*Primary Examiner* — Bryan Bui
(74) *Attorney, Agent, or Firm* — Patterson Thuente Pedersen, P.A.

(57) ABSTRACT

A device, computer program and related method for processing a first seismic signal that includes identifying one portion of a second seismic signal and determining a length of a seismic wavelet. It is also possible to train a neural network by using a plurality of sub-portions of said portion a input variables and at least one second piece of information as a target variable. Said sub-portions of the portion have a length dependent on the length of the seismic wavelet determined. Finally, the method includes determining at least one first piece of geological information based on the first seismic signal using said trained neural network.

9 Claims, 8 Drawing Sheets

(56) References Cited

U.S. PATENT DOCUMENTS

2009/0119018 A1    5/2009  Priezzhev et al.
2014/0102694 A1*   4/2014  Hargreaves ............ G01V 1/003
                                                         166/250.01

OTHER PUBLICATIONS

English translation of International Search Report for PCT/FR2014/052395, dated Mar. 30, 2015, 3 pages.
FR Search Report for FR 1360836, dated Jun. 12, 2014, 8 pages.
Zhengping Liu et al: "Seismic-controlled nonlinear extrapolation of well parameters using neural networks", Geophysics, vol. 63, No. 6, Nov. 1, 1998 (Nov. 1, 1998), pp. 2035-2041, XP055122511, ISSN: 0016-8033, DOI: 10.1190/1.1444496.
Rafael E. Banchs et al: "From 3D seismic attributes to pseudo-well-log volumes using neural networks: Practical considerations", Geophysics, vol. 21, No. 10, Oct. 1, 2002 (Oct. 1, 2002), pp. 996-1001, XP055122504, ISSN: 1070-485X, DOI: 10.1190/1.1518436.
Paulo Johann et al: "Reservoir Geophysics: Seismic Pattern Recognition Applied to Ultra-Deepwater Oilfield in Campos Basin, Offshore Brazil", SPE Latin American and Caribbean Petroleum Engineering Conference Held in Buenos Aires, Argentina, Mar. 25-28, 2001, Mar. 28, 2001 (Mar. 28, 2001), pp. 1-13, XP055122388, DOI: dx.doi.org/10.2118/69483-MS ISBN: 978-1-55-563926-6.

* cited by examiner

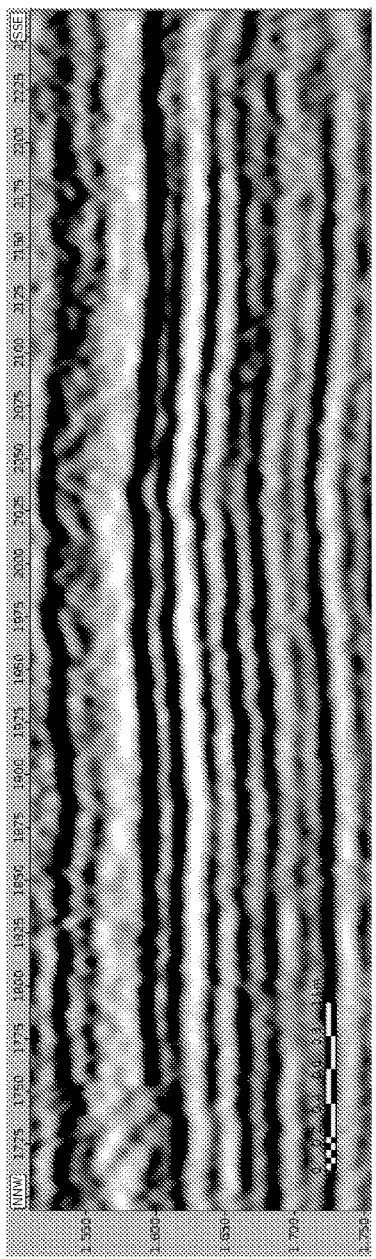
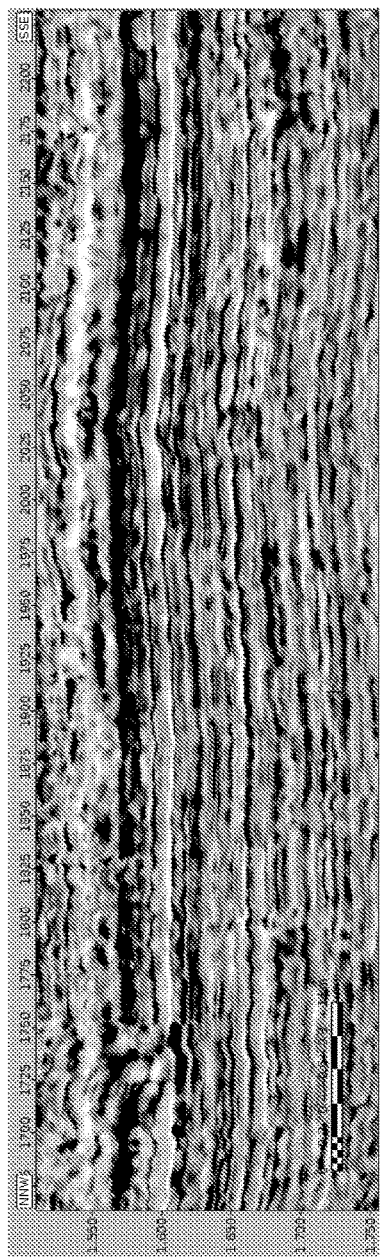
FIG. 5a
FIG. 5b

METHOD AND DEVICE FOR PROCESSING SEISMIC SIGNALS

RELATED APPLICATIONS

The present application is a National Phase entry of PCT Application No. PCT/FR2014/052395, filed Sep. 24, 2014, which claims priority from FR Patent Application No. 13 60836, filed Nov. 5, 2013, said applications being hereby incorporated by reference herein in their entirety.

FIELD OF THE INVENTION

The present invention relates to the processing of seismic signals and notably the field of the interpretation of seismic waves for the precise construction of images, notably for carbonated subsoils and for the detailed characterisation of reservoirs.

BACKGROUND OF THE INVENTION

When conducting seismic studies, the propagation rate of the seismic wavelet emitted is an important piece of data for the precise determination of a seismic image. Generally, a high propagation rate tends to reduce the vertical resolution of the image constructed using conventional seismic imaging tools.

In particular, calculation uncertainties may be such in defined rate models that a slight error in the time domain may give rise to significant variations in the spatial domain. This problem is increased if the seismic wavelet is propagated at a high rate in the subsoil under study (in particular, if the subsoil comprises carbonates, as in some reservoirs in the Middle East).

Vertical reservoir resolution is however useful for industrial firms seeking to operate these reservoirs. This resolution particularly enables:

superior estimation of the volumes of hydrocarbons or gas present in the subsoil;
superior modelling of the reservoirs for subsequent simulations (e.g. geo-modelling);
superior monitoring of drilling operations;
etc.

There is thus a need to process seismic signals in an enhanced way and thus increase seismic image resolution.

The present invention helps improve the situation.

SUMMARY OF THE INVENTION

For this purpose, the present invention proposes to enhance the processing of seismic signals in order to extract a maximum amount of information therefrom, and notably enhance the definition of the seismic images generated.

The present invention thus relates to a method for processing a first seismic signal. The method comprises the following steps:

receiving at least one second seismic signal derived from the emission of a seismic wavelet in a subsoil;
identifying at least one portion of said at least one second seismic signal corresponding to reflections of the seismic wavelet in a reservoir zone of said subsoil;
determining a length of the seismic wavelet;
receiving well data corresponding to said identified reservoir zone;
training a neural network using:

a plurality of sub-portions of said at least one portion as input variables, said sub-portions of the portion having a length dependent on the length of the seismic wavelet determined, and at least one second piece of geological information according to said well data as a target variable;
determining at least one first piece of geological information based on the first seismic signal using said trained neural network.

Indeed, it is possible for the seismic wavelet to be substantially constant (or subject to little variation) throughout the "reservoir" zone (i.e. consisting of rock suitable for capturing gas or hydrocarbons).

The use of a neural network can then make it possible to:
ignore the seismic wavelet considered by the constant (blind decomposition (the variation thereof being very slight in this zone));
use the knowledge of a well to enhance the resolution of the seismic acquisition in another zone of the subsoil ("generalisation").

The at least one second seismic signal may comprise a plurality of "pre-stack" seismic signals. Indeed, generally, processing methods use "stack" seismic signals as the processing complexity is too great with pre-stack signals. For all that, these pre-stack signals contain high-frequency information which is lost after stacking: consequently, the use of stack signals may lower the precision of the determination of geological information.

The term "well data" denotes the data obtained from a drill hole (optionally correcting drill hole geometry) or a well. These data may contain a large number of pieces of information have been previously filtered/sorted/computed so as to only contain a single type of data (e.g. reflectivity, porosity, etc.): filtered well data are generally referred to as "geological information".

Moreover, the wavelet length can be determined according to an autocorrelation calculation of said at least one portion.

The autocorrelation calculation enables the estimation of the length of the wavelet without having to measure same during the emission of this wavelet (for example, on the vibrator truck).

In one embodiment, the union of the plurality of sub-portions may be said at least one portion.

Furthermore, the length of the sub-portions may be the length of the seismic wavelet determined.

Alternatively, the length of the sub-portions may be between 0.5 and 2 times the length of the seismic wavelet determined. Obviously, this length may be adjusted according to the seismic well alignment uncertainty.

As such, it is possible to over-size the length of the sub-portions slightly if the length of the seismic wavelet is uncertain (e.g. the variance of this length is strictly greater than 0).

As such, the length of the sub-portions may be equal to the length of the seismic wavelet multiplied by a multiplication factor. This factor may be equal to 0.5 or 1.5 or be dependent on the variance calculated when determining the length of the seismic wavelet for a plurality of seismic traces.

In one embodiment, the second piece of geological information may be a piece of information from a group including a piece of porosity information, a piece of reflectivity information, a piece of density information, a piece of resistivity information and a piece of mineralogical composition information, a piece of gamma-ray log information, a piece of density information, a piece of sound propagation rate information, a piece of permeability information and a piece of saturation information.

The second piece of geological information may be a piece of filtered information in a given frequency range.

The given frequency range may be a single frequency.

This filtering makes it possible to limit the amount of information for training the neural network. As such, this filtering enables superior convergence of the model and superior precision.

A device intended to process a seismic signal in an effective way may be advantageous per se.

As such, the present invention also relates to a device intended to process a first seismic signal.

The device comprises:
- an interface for receiving at least one second seismic signal derived from the emission of a seismic wavelet in a subsoil;
- a circuit for identifying at least one portion of said at least one second seismic signal corresponding to reflections of the seismic wavelet in a reservoir zone of said subsoil;
- a circuit for determining a length of the seismic wavelet;
- an interface for receiving well data corresponding to said identified reservoir zone;
- a circuit for training a neural network using:
  a plurality of sub-portions of said at least one portion as input variables, said sub-portions of the portion having a length dependent on the length of the seismic wavelet determined,
  and at least one second piece of geological information according to said well data as the target variable;
- a circuit for determining at least one first piece of geological information based on the first seismic signal using said trained neural network.

A computer program, using all or part of the method described above, installed on pre-existing equipment, is advantageous per se, insofar as it makes it possible to process a seismic signal effectively.

As such, the present invention also relates to a computer program containing instructions for the use of the method described above, when this program is executed by a processor.

This program can use any programming language (for example, an object or other language), and be in the form of an interpretable source code, a partially compiled code or a fully compiled code.

FIG. 6 described in detail hereinafter can form the flow chart of the general algorithm of such a computer program.

Further features and advantages of the invention will emerge further on reading the following description.

BRIEF DESCRIPTION OF THE FIGURES

This is purely illustrative and should be read with reference to the appended figures wherein:

FIG. 5a illustrates a seismic image obtained without a neural network as described above, (i.e. obtained by "conventional" processing);

FIG. 5b illustrates a seismic image obtained with the use of a neural network described above;

DETAILED DESCRIPTION OF THE INVENTION

Figure 1:
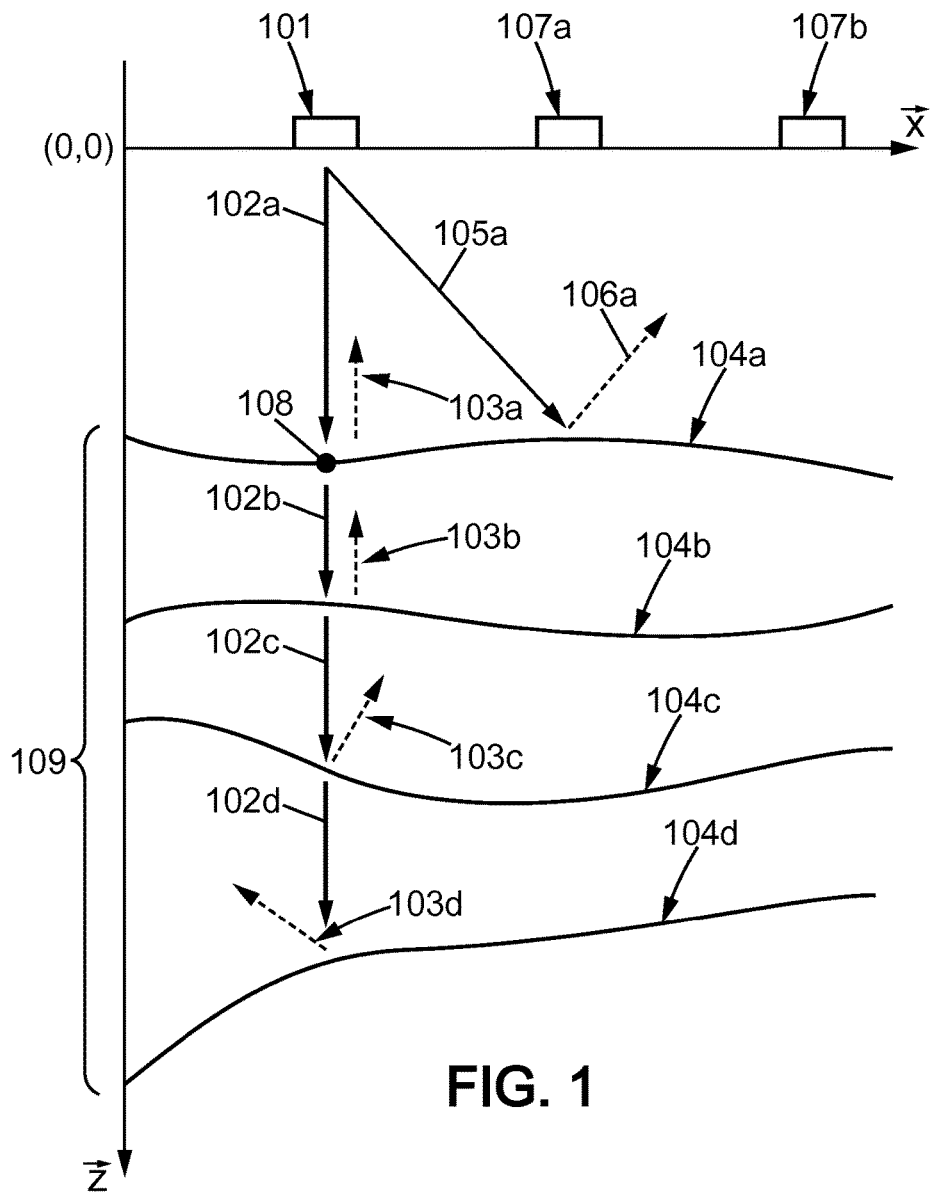
FIG. 1 illustrates an illustration of seismic reflections in a particular embodiment.

FIG. 1 illustrates an illustration of seismic reflections in a particular embodiment.

Following the emission of a seismic wavelet in the subsoil, by a seismic vibrator truck 101 for example, this wavelet is propagated in the subsoil vertically (arrow 102a, 102b, 102c, 102d) but also in all spatial directions (arrow 105a).

The term "seismic wavelet" denotes the seismic pulse or elementary wavetrains emitted by the vibration source (e.g. vibrator truck).

This wavelet is reflected by the interfaces (104a, 104b, 104c, 104d) for the change of propagation index in the subsoil: the reflected wave (103a, 103b, 103c, 103d, 106a) is propagated in a direction symmetric to the direction of incidence with respect to a normal to the interface at the incidence zone.

For example, if the interface 104a is perpendicular to the wave 102a at the point 108, then the reflected wave 103a will be in the same direction as the incident wave 102a (but in the opposite direction).

In order to capture the waves reflected in varied directions, it is possible to place different geophones 107a or 107b at different distances (or offsets) from the seismic truck 101. As such, the reflected wave 106a can be captured by the geophone 107b.

There are numerous methods for determining, on the basis of the geophone records, the trajectory of the wavelets (e.g. seismic migration). These methods generally supply seismic images based on "pre-stack" signals or on "stack" signals.

During the reception of the seismic signal, a portion of the signal arriving after another portion of the signal is generally representative of a reflection located more in-depth. As such, it is possible, with the knowledge of the values of a reservoir 109 in the subsoil, to process a signal received by the different geophones so as to retrieve a filtered/processed signal therefrom, only containing information relating to the reflections occurring within this reservoir (i.e. temporal definition of the signal received).

Figure 2A:
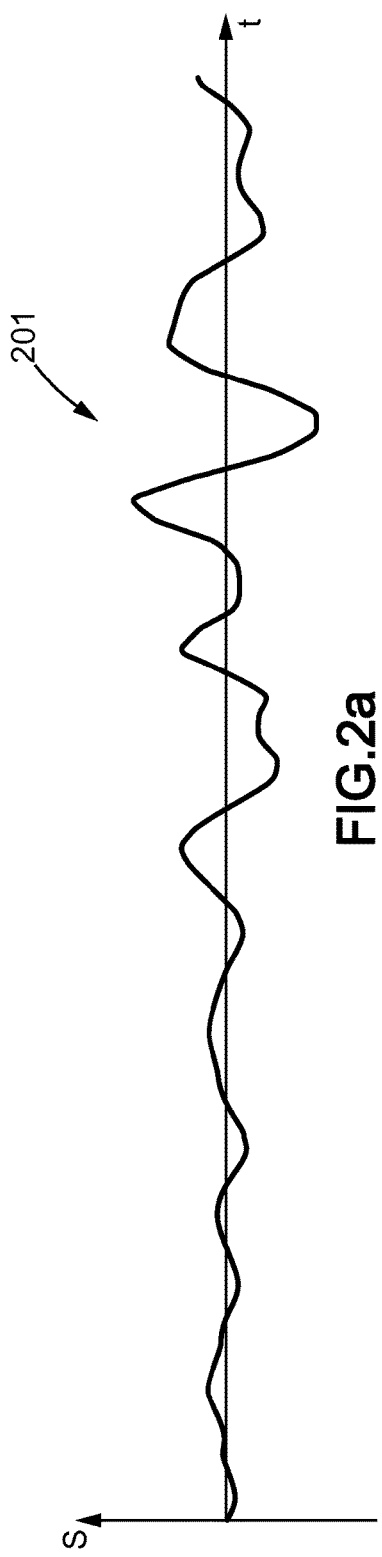
FIG. 2a illustrates an example of a seismic signal received in response to the emission of a seismic wavelet in a reservoir and in one embodiment of the invention.

FIG. 2a illustrates an example of a seismic signal received in response to the emission of a seismic wavelet in a reservoir and in one embodiment of the invention.

The seismic signal received (optionally after temporal definition as mentioned above) can be represented by the graph 201. The axis t is herein a time axis expressed in seconds, fractions of seconds or in number of samples (the signal being in this case sampled according to a predetermined frequency). The axis S is representative, for example, of a power or an amplitude of the acoustic signal received.

Obviously, it is difficult, on the basis of this signal, to determine the shape or length of the wavelet emitted. For this purpose, it is possible to carry out de-convolution of the signal received on the assumption that an interface of the subsoil can be represented by a pulse response optionally including a reflectivity model and/or an attenuation model.

This method is relatively complex to implement and implies good knowledge of the temporal position of the interfaces.

Furthermore, this de-convolution is generally incomplete and a signal containing high-frequency information (e.g. greater than 100 Hz) may remain. This residual signal is generally considered, by the prior art, as a noise.

Figure 2B:
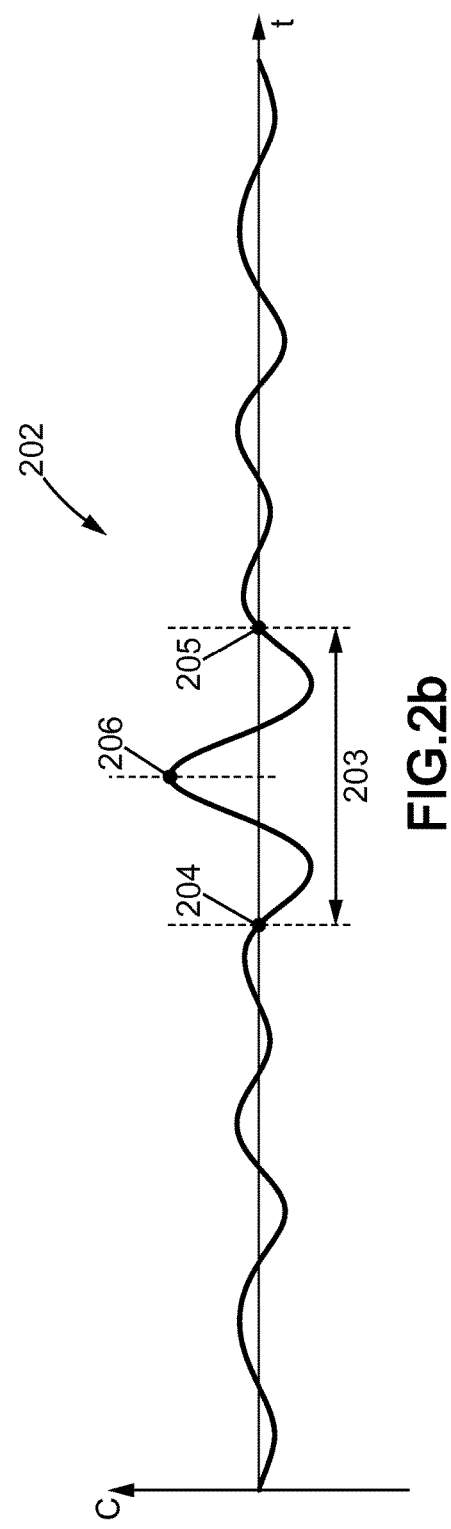
FIG. 2b illustrates an example of autocorrelation of the signal in FIG. 2a in one embodiment according to the invention.

FIG. 2b illustrates an example of autocorrelation of the signal in FIG. 2a in one embodiment according to the invention.

Indeed, it is possible to determine an estimation of the length of the wavelet emitted without having to compute complex de-convolutions.

It is possible to compute the autocorrelation of the signal received after temporal definition thereof in a time window corresponding to the reservoir. An autocorrelation is a correlation of a signal by itself, this second signal being offset by a given time interval.

The autocorrelation of the signal 201 is the curve 202. The X-axis of this curve represents the time interval between the two correlated identical signals and the Y-axis shows the correlation of these two curves for the time interval in question.

In this FIG. 2b, the correlation of the two signals is sometimes high, sometimes low. The repetition (or "respiration") of this correlation thus makes it possible to determine a representative correlation distance of the length of the wavelet having generated this signal. This correlation distance 203 is the distance between the two symmetric zeros (204, 205) with respect to the maximum peak 206.

If a plurality of distances are used to compute the length of the wavelet (e.g. for a plurality of seismic traces), it is possible to determine a variance of this distance in order to determine the precision of this determination.

Figure 3A:
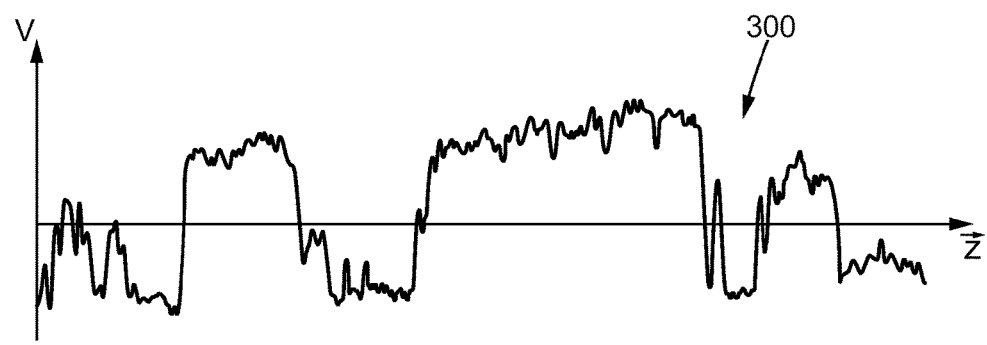
FIG. 3a illustrates an example of well data in one embodiment according to the invention.

FIG. 3a illustrates an example of well data in one embodiment according to the invention.

The term "well data" denotes geological, geophysical or other data, obtained, for example, from drill holes. They are, for example, one or a plurality of pieces of information located along the well relating to:
the facies of the subsoil;
rock reflectivity;
rock porosity;
rock resistivity;
rock elasticity;
rock permeability;
etc.

When the well data only contain a single piece of information (e.g. the reflectivity), the term "geological information" is preferably used hereinafter.

Most of these pieces of information are expressed in numeric form (e.g. the reflectivity expressed as a percentage, the permeability expressed in Darcy, the porosity expressed as a percentage, etc.).

By way of illustration, the curve 300 represents well data for a reservoir zone of the subsoil (relating to the rock reflectivity). The X-axis of this curve represents the depth of the well data item and the Y-axis represents the value thereof. These data are data containing "high-frequency" information.

Figure 3B:
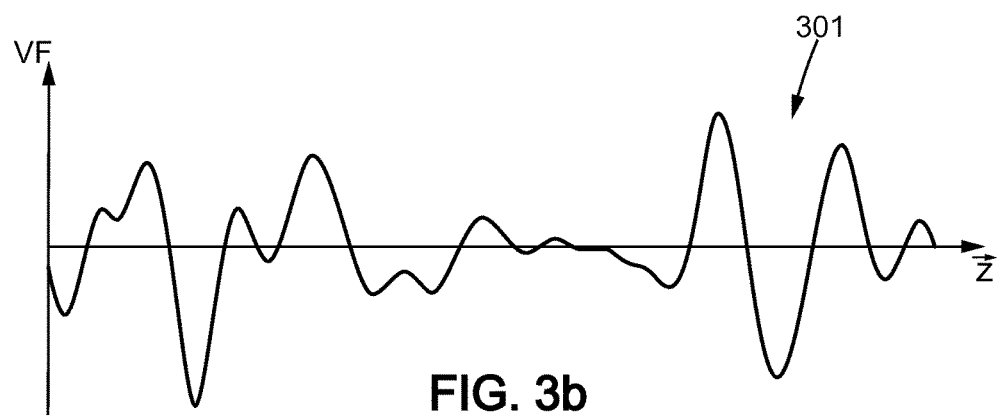
FIG. 3b illustrates an example of filtered well data in one embodiment according to the invention.

FIG. 3b illustrates an example of filtered well data in one embodiment according to the invention.

It is possible to process the raw well data received in order to obtain modified/processed data. For example, the processing may comprise a filter making it possible to only retain a fine frequency range (e.g. 90-100 Hz) or advantageously a broader frequency range (e.g. from 0 Hz to 200 Hz) including the value 0 Hz.

The curve 301 represents the data derived from filtering the data of the curve 300 at a frequency band of 0-200 Hz.

Figure 4A:
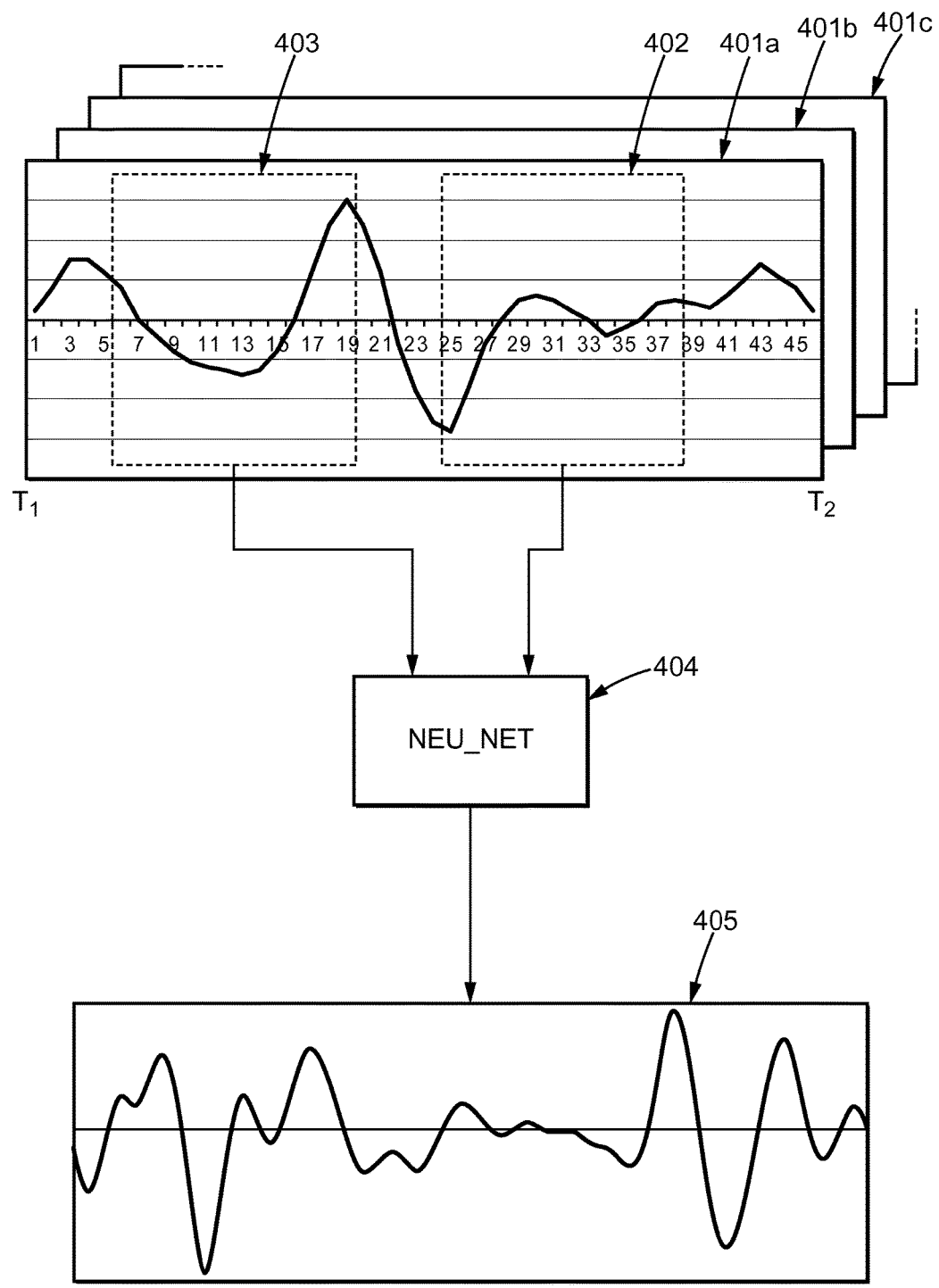
FIG. 4a illustrates training of a neural network based on seismic signal data and filtered well data in one embodiment according to the invention.

FIG. 4a illustrates training of a neural network based on seismic signal data and filtered well data in one embodiment according to the invention.

In order to carry out training of a neural network 404 using a back propagation principle, it is useful to provide the neural network 404 with numerous examples of input values associated with one or a plurality of output values. These values are referred to as a "training set".

This training is in fact "supervised" training as the correct output values are known for each input value.

During the training, the nodes of the neural network 404 are modified. Numerous algorithms are possible for such modifications (i.e. modification of weightings of the different nodes).

It is also possible to envisage a set of input and output values suitable for validating the neural network and/or computing the error of this network: this is referred to as the "validation set". In practice, the training set is frequently approximately two times greater than the validation set (e.g. in a 70%-30% ratio for example).

In the embodiment shown, it is possible to adopt a plurality of sub-portions (402, 403) of the pre-stack signal (401a, 401b, 401c, etc.) as input values.

Obviously, if the signal is a stack signal, it is possible to work directly with this signal rather than with each of the pre-stack signals. Using pre-stack signals makes it possible to prevent of the loss of "high-frequency" information associated with the stacking of signals which are not perfectly "corrected" (e.g. "normal moveout correction").

The length of these sub-portions is the length of the wavelet determined previously. Nevertheless, it is also possible to select a multiple of the length of the wavelet determined previously (e.g. with a multiplication factor of 1.1 or 1.5 or 2) as the length of these sub-portions: indeed, if the sub-portion is slightly greater than the wavelet, the precision of the neural network can be greater (notably in the event of poor evaluation of the length of the wavelet or in the event of poor well-seismic alignment) even though the convergence of the neural network during training may be slower.

In the embodiment shown, it is possible to take a single output value for all the input values of the training set. This single output value is the processed/filtered signal 405 derived from the well data and limited to the "reservoir" domain.

Training the neural network can make it possible to avoid computing complex de-convolutions as mentioned with reference to FIG. 2a. Furthermore, the neural network accounts for the entire signal received, including the "high-frequency" information previously considered as noise to be removed from the computations.

The data returned by the neural network are of the same type as the well data used for training: if the well data used for training are pieces of reflectivity information, the neural network returns reflectivity information, etc.

Figure 4B:
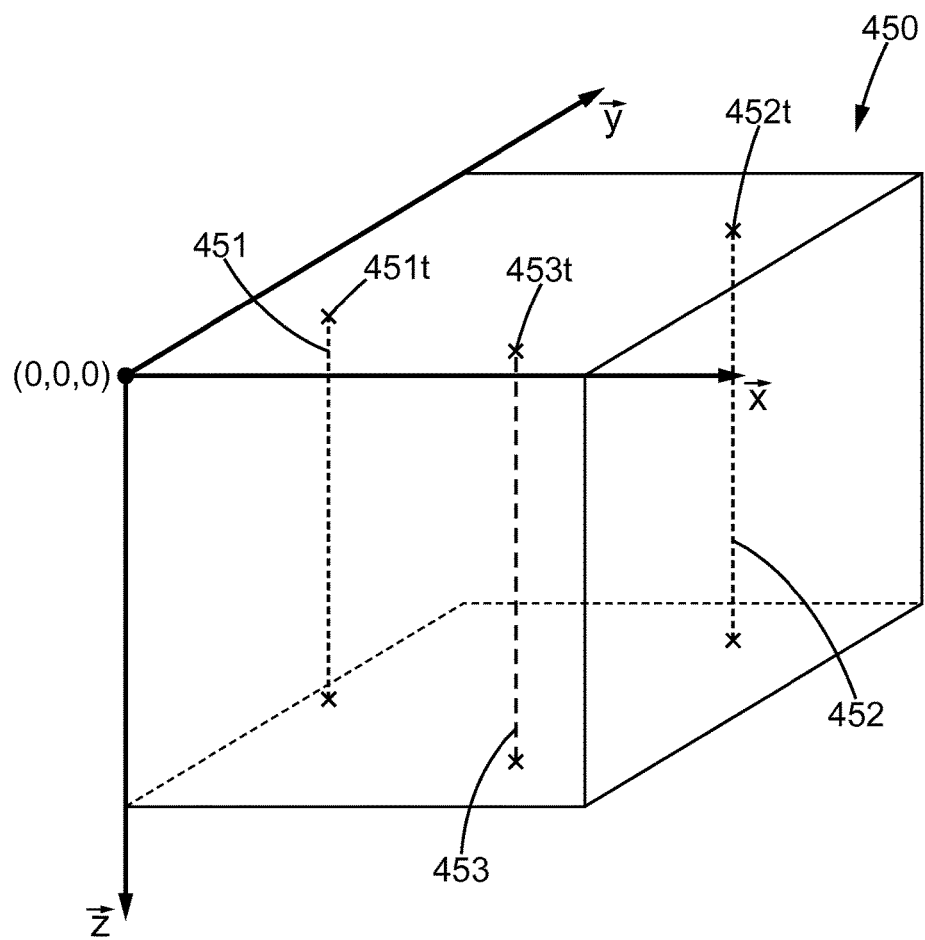
FIG. 4b illustrates a three-dimensional representation of a geological subsoil.

FIG. 4b illustrates a three-dimensional representation of a geological subsoil.

In this representation 450, the well data on the wells 451 and 452 are known.

It is thus possible to carry out training of the neural network 404 using, as input data, sub-portions of the pre-stack signal received at the wellhead 451t and associated with the known well data on the well 451.

It is also possible to add to these input and output data further data obtained from other wells such as the well 452. As such, the training is carried out using:
- as input data, sub-portions of the pre-stack signal received at the wellhead 451t and associated with the known well data on the well 451 (and optionally modified as described above);
- and, as input data, sub-portions of the pre-stack signal received at the wellhead 452t and associated with the known well data on the well 452 (and optionally modified as described above).

Once the training of the neural network is complete, it is possible to have the neural network determine well data along a "virtual" well (i.e. vertical segment along $\vec{z}$ of the space $(\vec{x}, \vec{y}, \vec{z})$ not actually drilled, e.g. segment 453) on the basis of the seismic signal received at the wellhead (e.g. point 453t) of this "virtual" well.

FIG. 5a illustrates a seismic image 501 obtained using determination methods according to the prior art, without a neural network. FIG. 5b illustrates a seismic image 502 obtained with the use of a neural network described above.

It is possible to perceive a greater level of detail on the image 502 than on the image 501. Indeed, the definition of the seismic image 502 is notably increased due to the inclusion of "high-frequency" information previously ignored during de-convolutions according to the prior art and considered to be noise.

Figure 6:
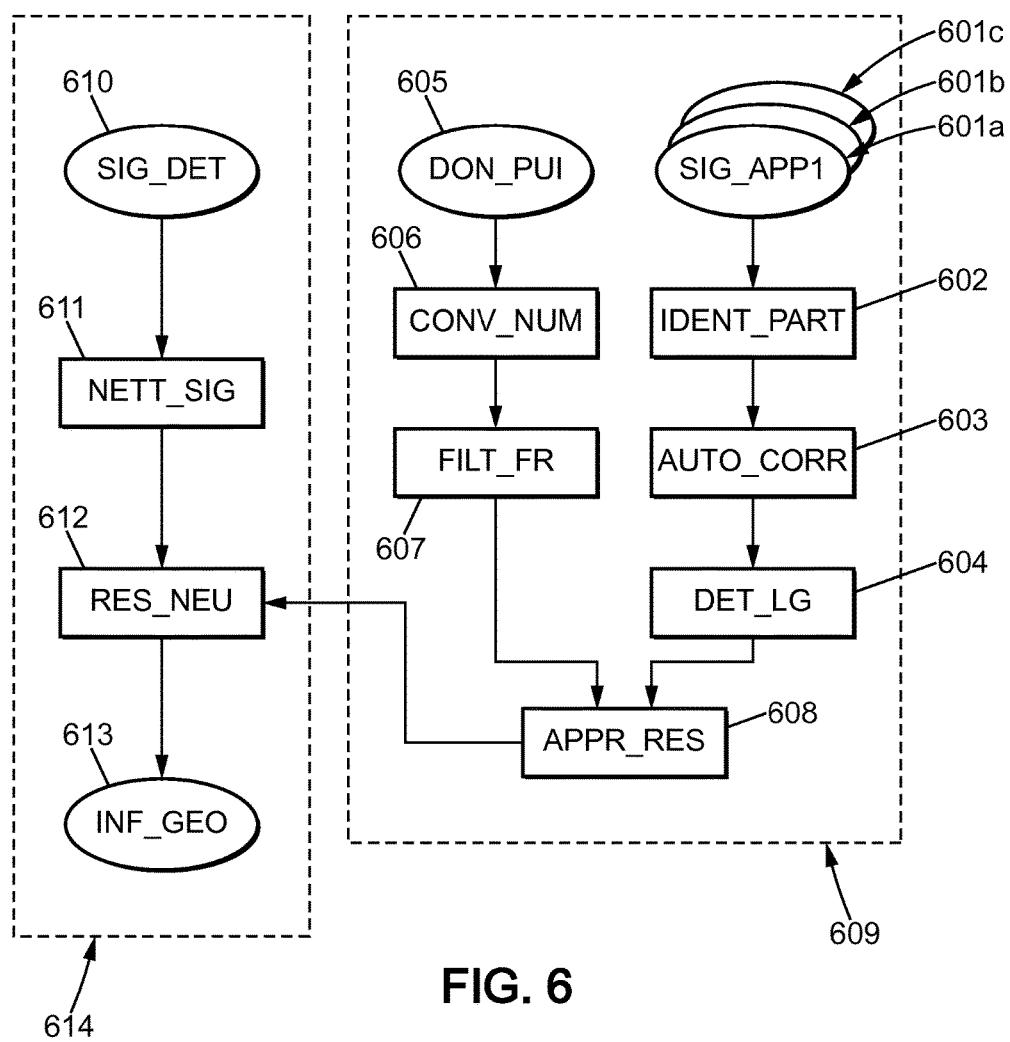
FIG. 6 illustrates a possible flow chart of a method in one embodiment of the invention.

FIG. 6 illustrates a possible flow chart of a method in one embodiment of the invention.

On receiving seismic signals (601a, 601b, 601c, etc.), it is possible to identify (step 602), in each thereof, a portion corresponding to the propagation and reflection of the wavelet emitted, in the reservoir.

This wavelet is assumed to be invariant in this domain.

The seismic signals correspond, for example, to a plurality of wavelet emissions in the subsoil, at different times and/or locations. Moreover, these signals may correspond to the various signals received during the emission of the same wavelet by a plurality of geophones. Corrective processing of these signals may have been performed upstream, for example to correct the propagation rates in the subsoil for each of the signals.

For each portion of signals previously identified, it is also possible to compute an autocorrelation (step 603) of this portion so as to estimate the length of the seismic wavelet.

Once the length of the wavelet has been determined, it is possible to determine (step 604) a "clipping" length of the portion. This clipping length can be equal to the length of the wavelet but can also be a multiple of the length of the wavelet determined. For example, if the length of the wavelet is relatively certain (e.g. variance close to zero on determining the length of the wavelet), the multiplication factor can be close to 1. If the variance is great, the multiplication factor can then increase.

The "clipping" length determined in step 604 can make it possible to break down each portion into a plurality of sub-portions. These sub-portions can be juxtaposed without overlapping or they can be partially juxtaposed.

Moreover, it is possible to receive well data 605. These well data are the data associated with the signals and corresponding substantially to the same locations as the latter: as such, if a seismic signal is received as a coordinate (x,y), then the well data are obtained from drill holes wherein the wellhead coordinates are (x±Δx, y±Δy) where Δx and Δy are representative values of an uncertainty relating to the well-seismic alignment.

These well data are then processed in order to convert same if required to numeric data (filtering 607, allocation of numeric values 606 to qualitative values, etc.).

It is then possible to carry out training (step 608) of a blank or partially trained neural network. This training can use previously determined sub-portions as input variables and the processed well data set as an output variable (or target variable). Only a subset of these sub-portions (e.g. 70%) can be used for training this neural network. The other sub-portions (e.g. 30%) are then used as validation variables in order to quantify the precision and the error rate of the neural network.

The method 609 is referred to as "training".

Once this training has been performed, it is possible to receive a seismic signal (610) wherein the associated well data are unknown. It is also possible to remove from this signal 610 the portions thereof not corresponding to a reflection of a wavelet in the reservoir (step 611): this is described as "cleaning the seismic signal".

This "cleaned" signal can then be supplied as an input of the neural network having undergone training 609 (step 612).

As such, the neural network can return, as an output, well data (or geological information) associated with the "cleaned" input signal. These well data are consistent with the well data used for training (i.e. the pieces of geological information are pieces of reflectivity information filtered at 0-200 Hz if the well data used for training are pieces of reflectivity information filtered at 0-200 Hz, the pieces of geological information are pieces of porosity information filtered between 0 and 300 Hz if the pieces of geological information used for training are pieces of porosity information filtered between 0 and 300 Hz, etc.)

The method 614 is referred to as "generalisation" as it makes it possible to determine well data (or geological information) at locations of the subsoil where no drilling has been carried out.

Figure 7:
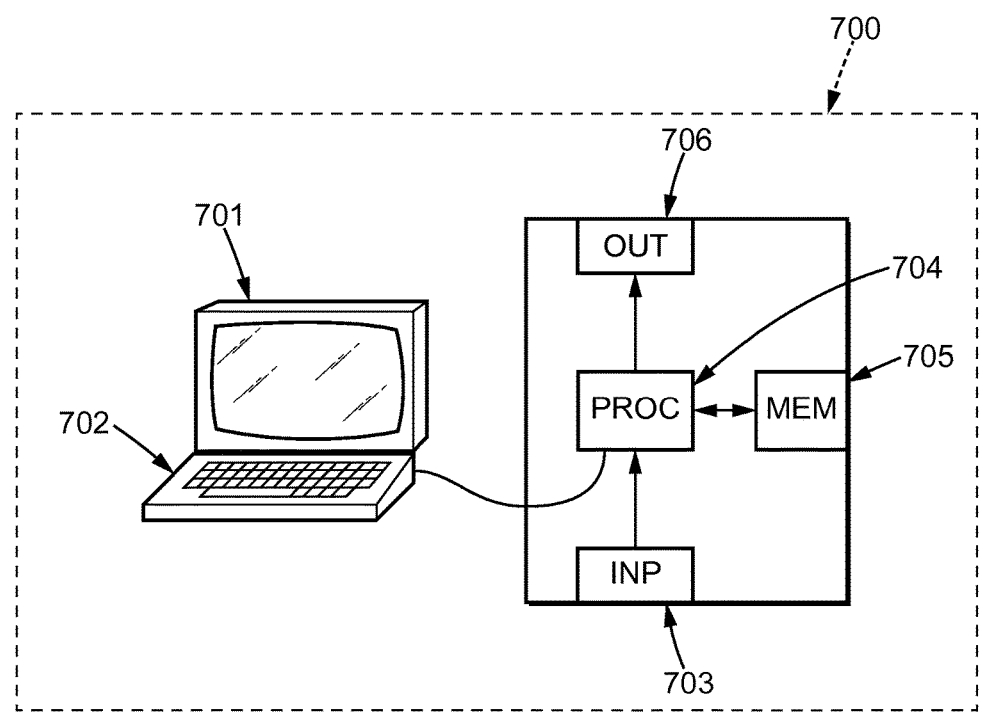
FIG. 7 is an example of a device suitable for implementing an embodiment of the invention.

FIG. 7 represents an example of a device for processing a seismic signal in one embodiment of the invention.

In this embodiment, the device includes a computer 700, comprising a memory 705 to store instructions for implementing the method, the measurement data received, and temporary data to carry out the various steps of the method as described above.

The computer further includes a circuit 704. This circuit can be, for example:
- a processor suitable for interpreting instructions in computer program format, or
- an electronic card wherein the steps of the method according to the invention are described in silicon, or
- a programmable electronic array such as an FPGA array (Field-Programmable Gate Array).

This computer includes an input interface 703 for receiving seismic data or well data, and an output interface 706 for supplying the well data at any spatial point. Finally, the computer can include, to enable easy interaction with a user, a screen 701 and a keyboard 702. Obviously, the keyboard is optional, notably in the case of a computer in the form of a tactile tablet, for example.

Moreover, the functional diagram shown in FIG. 6 is a typical example of a program wherein some instructions can be carried out with the equipment described. As such, FIG. 6 can correspond to the flow chart of the general algorithm of a computer program according to the invention.

Obviously, the present invention is not limited to the embodiments described above by way of examples; it applies to further alternative embodiments.

Further embodiments are possible.

For example, the set of figures described may appear to indicate that the drill holes are vertical (or at least linear). Nevertheless, the methods described can be generalised to the case of crooked wells. In the latter scenario, the trajectory of the well can be approximated or "rendered discrete" by a plurality of vertical segments and each of these segments is then considered as a well in its own right in the methods described. As such, during the training of the neural network, the input variables can be the signals received vertically from each segment, each of these signals being associated with the well data for this segment as an output/target variable.

The invention claimed is:

1. A method for processing a first seismic signal, the method comprising the following steps:
    receiving at least one second seismic signal derived from the emission of a seismic wavelet in a subsoil;
    identifying at least one portion of said at least one second seismic signal corresponding to reflections of the seismic wavelet in a reservoir zone of said subsoil;
    determining a length of the seismic wavelet;
    receiving well data corresponding to said identified reservoir zone;
    training a neural network using:
    a plurality of sub-portions of said at least one portion as input variables, said sub-portions of the portion having a length dependent on the length of the seismic wavelet determined,
    and at least one second piece of geological information according to said well data as the target variable;
    determining at least one first piece of geological information based on the first seismic signal using said trained neural network.

2. The method according to claim 1, wherein the wavelet length is determined according to an autocorrelation calculation of said at least one portion.

3. The method according to claim 1, wherein the union of the plurality of sub-portions is said at least one portion.

4. The method according to claim 1, wherein the length of the sub-portions is the length of the seismic wavelet determined.

5. The method according to claim 1, wherein the length of the sub-portions is between 0.5 and two times the length of the seismic wavelet determined.

6. The method according to claim 1, wherein the second piece of geological information is a piece of information from a group including a piece of porosity information, a piece of reflectivity information, a piece of density information, a piece of resistivity information and a piece of mineralogical composition information, a piece of gamma-ray log information, a piece of density information, a piece of sound propagation rate information, a piece of permeability information and a piece of saturation information.

7. The method according to claim 1, wherein the second piece of geological information is a piece of filtered information in a given frequency range.

8. A computer program product containing instructions on a tangible recording medium, said instructions being executed by a processor to implement the method of claim 1.

9. A device for processing a first seismic signal, the device comprising:
    an interface for receiving at least one second seismic signal derived from the emission of a seismic wavelet in a subsoil;
    a circuit for identifying at least one portion of said at least one second seismic signal corresponding to reflections of the seismic wavelet in a reservoir zone of said subsoil;
    a circuit for determining a length of the seismic wavelet;
    an interface for receiving well data corresponding to said identified reservoir zone;
    a circuit for training a neural network using:
    a plurality of sub-portions of said at least one portion as input variables, said sub-portions of the portion having a length dependent on the length of the seismic wavelet determined,
    and at least one second piece of geological information according to said well data as the target variable;
    a circuit for determining at least one first piece of geological information based on the first seismic signal using said trained neural network.

* * * * *